:::
United States Patent Office 3,145,080
Patented Aug. 18, 1964

3,145,080
PURIFICATION OF DILUTE COMMERCIAL SULFURIC ACID
Kurt Jockers, Ludwigshafen (Rhine), and Hermann Meier, Ludwigshafen (Rhine)-Gartenstadt, Germany, assignors to Badische Anilin- & Soda-Fabrik Aktiengesellschaft, Ludwigshafen (Rhine), Germany
No Drawing. Filed Oct. 27, 1961, Ser. No. 148,040
Claims priority, application Germany Nov. 15, 1960
5 Claims. (Cl. 23—172)

This invention relates to a process for removing small amounts of inorganic and organic impurities contained in dilute commercial sulfuric acid.

More specifically, the invention relates to carrying out the said process in towers.

Commercial sulfuric acid always contains small amounts of inorganic impurities from its production. The nature of the impurities and also their amounts vary with the origin of the acid and with the raw materials used for its production. In most commercial acids, contamination by the elements calcium, iron, lead, copper, arsensic, mercury, silver, antimony and the like is to be expected. The amounts of these impurities vary between for example about 10 to 50 mg. per kg. of $H_2SO_4$ for iron,
2 to 5 mg. per kg. of $H_2SO_4$ for lead and
0.1 to 1 mg. per kg. of $H_2SO_4$ for arsenic.

For most applications of sulfuric acid, the said slight contamination is without importance. The contaminants, however, may be very troublesome in special chemical processes such as electrolytic and catalytic processes. This is also true when the acid is to be used for the production of pharmaceuticals. The elements mercury, arsenic, copper and lead are especially troublesome in this respect.

In the said cases, a sulfuric acid which has been prepared by a special process has hitherto been used. A known process for such preparation is from distilled sulfur trioxide and condensed water in a special apparatus. This acid is relatively expensive. If large amounts of the acid are required, then by branching off large amounts of 100% sulfur trioxide from the normal production process of a sulfuric acid works, the water balance (production of $SO_3$ 100%: production of $SO_3$ as $H_2SO_4$) is disturbed.

It has therefore been very important to discover a process which would permit easy purification of normal commercial sulfuric acid from traces of the said elements.

The process according to this invention for the purification of dilute commercial sulfuric acid from inorganic and organic impurities being present in small amounts comprises treating the sulfuric acid in the presence of active carbon with hydrogen sulfide in an amount between about 2 mg. per liter of sulfuric acid and the amount corresponding to the solubility of hydrogen sulfide in the sulfuric acid used and, after separation of the active carbon from the sulfuric acid, destroying the residual hydrogen sulfide with hydrogen peroxide in the presence of active carbon.

Preferably, about 5 to 50 mg. of hydrogen sulfide per liter of sulfuric acid is used.

The precipitation of sulfides of poor solubility from dilute sulfuric acid is a well-known technique. According to this technique, the sulfuric acid is first saturated with hydrogen sulfide while cold or while hot and thereupon the precipitated sulfides are usually separated by filtration, in some cases using a filter aid. On a technical scale, filtration is usually not easy because of the physical nature of the precipitates. This method of purification can only be carried out if there are relatively large amounts of impurities. Thus for example scrubber acids containing large amounts of arsenic are often purified in this way.

If, however, the amount of impurities present is only on the order of p.p.m., the purification with hydrogen sulfide in the said manner cannot be carried out. Even if the sulfides were precipitated to the extent of 100%, they would be obtained only in amounts of a few hundred milligrams per 1,000 liters of acid. Precipitation does not take place until after hours or days and is always very incomplete.

In order to avoid this difficulty, it has been proposed to remove especially troublesome impurities, as for example mercury, from dilute sulfuric acid by leading the acid through a bed of pulverized lead blende. The mercury is thus easily removed by exchange with lead. This method can only be used, however, when the increase in the amount of lead in the sulfuric acid is without importance for the use to which the purified acid is to be put.

The process according to this invention avoids this disadvantage. Only small amounts of hydrogen sulfide are required for the purification. These amounts lie far below the saturation limits. No heating of the acid is necessary. Moreover the process avoids any filtration. It works very rapidly and without expenditure for special apparatus.

The sulfuric acid to which small amounts of hydrogen sulfide, for example 20 mg. of $H_2S$ per liter of acid, have been added, is advantageously passed through a tower which is charged with granular active carbon. By reason of the high concentration of hydrogen sulfide at the surface of the active carbon, it makes possible rapid precipitation of the impurities as sulfides which in turn remain so strongly adsorbed on the active carbon that in some cases they cannot be detected at all in the effluent acid.

The excess of hydrogen sulfide remaining in the purified sulfuric acid is quantitatively removed by adding hydrogen peroxide. The hydrogen peroxide is so metered that slight excess is present beyond the amount necessary for the oxidation of the hydrogen sulfide to sulfuric acid. The amount of hydrogen peroxide used may be up to five times the amount of hydrogen sulfide used. For example, when treating sulfuric acid with about 5 to 50 mg. of hydrogen sulfide per liter of sulfuric acid, the amount of hydrogen peroxide may be about 25 to 250 mg. per liter of sulfuric acid. The sulfuric acid containing hydrogen sulfide to which hydrogen peroxide has been added is passed over active carbon, conveniently also in a tower. The active carbon acts as a catalyst for the oxidation of the hydrogen sulfide and as a catalyst for the decomposition of the slight excess of hydrogen peroxide to water and oxygen.

Solutions of sodium sulfide, sodium hydrogen sulfide, ammonium sulfide, ammonium hydrogen sulfide or calcium sulfide may be used instead of hydrogen sulfide if the slight contamination of the acid with sodium sulfate, ammonium sulfate or calcium sulfate thereby caused is not harmful.

A relatively coarse-pored carbon with a surface of about 1,000 square meters per gram and a grain size of about 3 mm. is advantageously used as the active carbon.

The residence period of the sulfuric acid to be purified in contact with the active carbon for the treatment with hydrogen sulfide is about 5 to 10 minutes and for the treatment with hydrogen peroxide about 3 to 6 minutes. This residence period depends on the nature of the active carbon used.

The purifying effect of a tower serving for the treatment of the sulfuric acid with hydrogen sulfide depends on the concentration of hydrogen sulfide in the sulfuric acid, on the size and accessibility of the surface of the active carbon and on the residence period of the acid in the tower.

With the numerical values given above, a sulfuric acid is obtained in which mercury, arsenic, antimony and selenium are no longer detectable. 0.2 mg. Cu and 2.5 mg. Pb remain per kilogram of concentrated $H_2SO_4$.

If the concentrations of the above-mentioned injurious elements are so high that after adding hydrogen sulfide a visible precipitate of sulfides forms within a few minutes, there is the risk that part of the sulfides formed may float through the tower and very rapidly clog it up. In such cases a filter is interposed for the removal of the bulk of the injurious substances. Such prefiltered sulfuric acid is purified so well and rapidly in the tower as is not possible by precipitation alone, especially with such small amounts of hydrogen sulfide.

Besides the above-mentioned contamination of commercial sulfuric acid with inorganic substances, such acid is, as a rule, also contaminated with traces of organic substances, as may often be seen from its color.

If the dilute sulfuric acid is used for catalytic purposes, the said substances may have the very troublesome effect of polluting the catalyst. The removal of these organic substances may very readily be combined with the removal of the inorganic substances by interposing, in front of the tower for the treatment of the sulfuric acid with hydrogen sulfide, a tower which is also filled with active carbon. When the amounts of organic substances are very small, interposition of the second tower may be dispensed with. Adsorption of these substances then takes place together with the adsorption of the sulfides.

The process according to the invention is simple and inexpensive. It has great economical advantages in special cases, as for example in the catalytic process for the production of hydroxylammonium sulfate, for the production of battery acid and for pickling purposes.

The invention is illustrated by, but not limited to, the following examples.

*Example 1*

Commercial 96% sulfuric acid which contains (per kilogram of concentrated acid):

1.32 mg. mercury
0.48 mg. arsenic
1.71 mg. copper
6.30 mg. lead and
2.1 mg. selenium and is pale brown in color is diluted with water to about 20% by weight.

The dilute sulfuric acid thus obtained is passed successively through three towers charged with active carbon. The residence period of the acid in each of the first two towers is 8 minutes and in the last tower 4 minutes. After passage through the first tower, the sulfuric acid is gassed with 20 mg. of hydrogen sulfide per liter of dilute acid. After passing through the second tower, hydrogen peroxide in the form of a 30% solution is added to the acid in an amount equivalent to 85 mg. of $H_2O_2$ 100% per liter of acid. The effluent sulfuric acid has a content of:

Less than 0.015 mg. mercury
Less than 0.018 mg. arsenic
0.21 mg. copper
2.5 mg. lead and
Less than 0.1 mg. selenium per kg. of concentrated $H_2SO_4$, and is entirely free from hydrogen sulfide.

The purification effect of the process according to this invention in respect of the organic substances cannot be given numerically, but may readily be seen optically.

If the unpurified sulfuric acid is used in the catalytic process for the production of hydroxyammonium sulfate from nitric oxide and hydrogen, the activity of the platinum catalyst falls to 50% of the original activity after a period of use of 3 days. Contrarily, the activity of the catalyst remains constant for weeks when the purified acid is used. The purified acid is thus fully equivalent to the acid prepared from distilled $SO_3$ and condensed water.

*Example 2*

(a) Commercial 96% sulfuric acid with a content of:

0.95 mg. mercury
0.72 mg. arsenic
0.63 mg. copper and
4.10 mg. lead calculated on 1 kg. of concentrated acid, is diluted to a content of about 20% by adding condensed water.

Part of the dilute acid is gassed with hydrogen sulfide at room temperature while excluding air. After waiting for 4 hours, a sample of the acid is filtered twice through filter paper. The dilute acid contains 28 mg. of hydrogen sulfide per liter. The first liter of the filtrate is discarded. After destroying the hydrogen sulfide, the following analysis values are obtained in the clear filtrate:

0.062 mg. mercury
0.110 mg. arsenic
0.59 mg. copper and
3.90 mg. lead per kg. of concentrated acid.

(b) With the same dilute acid, a purification is effected according to Example 1 in three successive towers containing active carbon. The residence period of the acid is 10 minutes in each of the first two towers and 4 minutes in the last tower. After passing through the first tower, the sulfuric acid is gassed with 17 mg. of hydrogen sulfide per liter. After the acid has been passed through the second tower, 80 mg. of $H_2O_2$ 100% is added in the form of a 30% solution per liter of acid. The effluent sulfuric acid contains:

Less than 0.015 mg. mercury
0.018 mg. arsenic
0.13 mg. copper and
2.50 mg. lead per kg. of concentrated acid, and is entirely free from hydrogen sulfide.

What we claim is:

1. A process for the purification of dilute commercial sulfuric acid which comprises treating said sulfuric acid in the presence of active carbon with hydrogen sulfide in an amount between about 2 mg. per liter of sulfuric acid and an amount corresponding to the solubility of hydrogen sulfide in the sulfuric acid and, after separating the active carbon from the sulfuric acid, destroying the remainder of the hydrogen sulfide with hydrogen peroxide in the presence of active carbon.

2. A process for the purification of dilute commercial sulfuric acid which comprises treating said sulfuric acid in the presence of active carbon with about five to 50 mg. of hydrogen sulfide per liter of sulfuric acid and, after separating the active carbon from the sulfuric acid, destroying the remainder of the hydrogen sulfide with hydrogen peroxide in the presence of active carbon.

3. A process as in claim 2 wherein from about 25 to about 250 mg. of hydrogen peroxide is used per liter of sulfuric acid.

4. A process as in claim 2 wherein a coarse-pored carbon with a surface of about 1,000 square meters per gram and a grain size of about 3 mm. is used as the active carbon.

5. A process as in claim 1 wherein the sulfuric acid is (1) passed through a first tower containing active carbon, (2) gassed with hydrogen sulfide, (3) passed through a second tower containing active carbon, (4) mixed with hydrogen peroxide, and (5) passed through a third tower containing active carbon.

References Cited in the file of this patent
UNITED STATES PATENTS

| | | |
|---|---|---|
| 314,548 | Thomson et al. | Mar. 24, 1885 |
| 1,842,884 | Taylor | Jan. 26, 1932 |
| 1,891,294 | Conway | Dec. 20, 1932 |
| 2,794,704 | Paulson et al. | June 4, 1957 |